United States Patent Office 3,576,016
Patented Apr. 20, 1971

3,576,016
PREPARATION OF BENZOQUINONES
Herman L. Finkbeiner, Ballston Lake, N.Y., assignor to
General Electric Company
No Drawing. Filed Apr. 1, 1968, Ser. No. 717,932
Int. Cl. C07c 49/02
U.S. Cl. 260—396
12 Claims

ABSTRACT OF THE DISCLOSURE

Poly(2,6-disubstituted-1,4-phenylene oxides) are reacted with an oxidizing agent in the presence of a carboxylic acid to produce the corresponding 2,6-disubstituted p-benzoquinones. These products are very reactive compounds and may be used as chemical intermediates, as oxidizing agents or they may be reduced to the corresponding hydroquinones which are useful for making polyesters, polycarbonates, polyurethanes, etc.

---

This invention relates to the preparation of p-benzoquinones from polyphenylene oxides. More specifically, this invention relates to the preparation of 2,6-disubstituted-p-benzoquinones from poly(2,6-disubstituted-1,4-phenylene oxides) by a process which comprises reacting said polyphenylene oxides with lead dioxide, nickel peroxide, manganic acetate or active manganese dioxide in the presence of a carboxylic acid.

Polyphenylene oxides, also called polyphenylene ethers, form an interesting group of polymers covered by U.S. Pat. 3,306,875—A. S. Hay. These polymers are made by an oxidative coupling reaction of various phenols in which the hydrogen of the phenolic group and the hydrogen or halogen on the benzene ring are removed in forming the poly(1,4-phenylene oxides). The most desirable poly(1,4-phenylene oxides) are made from 2,6-disubstituted phenols. They are linear polymers joined through the 1- and 4-position, with each unit of the polymer molecule being joined to the adjacent unit through the oxygen of the phenolic hydroxyl group. The most efficient method of producing these polyphenylene oxides are disclosed and claimed by Hay in U.S. Pats. 3,306,874 and 3,306,875 and in a copending application of Hay, Ser. No. 593,773, filed Nov. 14, 1966, now U.S. Pat. No. 3,432,466 and assigned to the same assignee as the present invention. This copending application discloses an improved method for oxidative coupling of 2,6-diaryl substituted phenols to form poly(2,6-diaryl-1,4-phenylene oxides).

Previous to Hay's discovery of the above oxidative coupling reaction, low molecular weight poly(1,4-phenylene oxides) having from 2 to 8 repeating units in the polymer molecule, had been prepared by an Ullmann reaction. Polyphenylene oxides can also be prepared by oxidation with various other oxidizing agents as disclosed in various U.S. patents of which the following are typical, 3,219,625; 3,219,626; 3,220,979; 3,228,910; 3,236,807; 3,257,357; and 3,260,701. Low molecular weight polymers can also be made by an equilibration reaction wherein a high molecular weight polyphenylene oxide is reacted with a phenol to produce lower molecular weight polyphenylene ethers ranging all the way from the dimer, trimer, etc., up to polymers approaching the molecular weight of the initial polyphenylene oxide, depending on the amount of phenol used. This process is disclosed and claimed in the copending application of Cooper et al., Ser. No. 547,180, filed May 3, 1966 now U.S. Pat. 3,496,236 and assigned to the same assignee as the present invention.

I have now discovered that there polyphenylene oxides made by any of the various processes, including the very low molecular weight materials, i.e., the dimer and trimer, can be converted to the corresponding p-benzoquinones providing the polyphenylene oxides are made from 2,6-disubstituted phenols wherein the substituents are other than halogen. This reaction involves reacting the polyphenylene oxide with an oxidizing agent selected from the group consisting of lead dioxide, nickel peroxide, manganic acetate and active manganese dioxide in the presence of a carboxylic acid. This is indeed surprising, in view of the fact that McNelis discloses that various phenols are oxidized to polyphenylene oxides with activated manganese dioxide in U.S. Pat. 3,220,979 and with lead dioxide in U.S. Pat. 3,260,701. Generally, in these reactions an excess of active manganese dioxide or lead dioxide is required in order to obtain good yields of the polymer and the reaction is carried out in the presence of an inert solvent which dissolves both the phenol and the polyphenylene oxide. Surprisingly enough, when I add a carboxylic acid to this polymer solution, the polymer is thereafter converted to the corresponding 2,6-disubstituted-p-benzoquinones. However, if the reaction of the 2,6-disubstituted phenol with these metal oxides is carried out in the presence of the carboxylic acid, the corresponding diphenoquinones are produced rather than the polymer. Therefore, the carboxylic acid can not be added until after the polymer formation.

p-Quinones are more oxidatively stable than the corresponding o-benzoquinones. Both types are non-aromatic in nature and they can be considered diethylenically unsaturated cycloaliphatic diketones. As such, they are analogous to open chain $\alpha,\beta$-unsaturated ketones, but are considerably more reactive with a wide variety of reagents that are reactive with ketones. The benzoquinones are oxidizing agents and readily react with mild reagents whereby they themselves are reduced to the corresponding dihydroxybenzene.

The general procedure for preparation of p-benzoquinones involves starting with a phenol followed by introduction of p-amino group or by starting with the amine followed by the introduction of a p-hydroxyl group. The corresponding p-aminophenol is then oxidized in acid solution to the p-benzoquinone. Since some of the quinones are so reactive and sensitive, the oxidation must be carried out under carefully controlled conditions. Other methods use oxidizing agents, which are difficult to prepare or dangerous to handle, for example, potassium nitrosodisulfonate, 85% hydrogen peroxide, etc. to oxidize phenols to p-benzoquinones. My process, in combination with the prior art processes of making polyphenylene oxides, provides a simple method by which 2,6-disubstituted phenols are oxidized to the corresponding polyphenylene oxides, using readily available materials followed by conversion of the polyphenylene oxides to the corresponding 2,6-disubstituted-p-benzoquinones. Both steps use readily available stable materials which are not dangerous to handle and no precautions need be taken to prevent oxidation of the product or the formation of undesirable by-products.

In producing the poly(2,6-disubstituted-1,4-phenylene oxide), any of the methods disclosed in the above-referenced patents and pending patent applications may be used to produce either high or low molecular weight polymers, or the Ullmann reaction may be used to produce low molecular weight polyphenylene oxides. If only a single p-benzoquinone is desired, the substituents on all of the repeating units of the polymer should be identical, i.e., the polymer should be a homopolymer. A mixture of p-quinones are produced if a copolymer is used. Since the conversion of the phenol to the polyphenylene oxide is carried out in solution in an inert solvent, such solutions of the polymer may be used directly. If desired, the polymer may be isolated from the solution, for example, by precipitation by adding a non-solvent and then redissolved in an inert solvent to free the solution from any by-products of the polymerization reaction and/or catalyst. The use of a solvent for the polyphenylene oxide is not necessary since the reaction with the oxidizing agent can be carried out by suspending the polyphenylene oxide in a carboxylic acid which is liquid at the reaction temperature. However, a faster reaction and better yields are obtained if the polyphenylene oxide is dissolved in a solvent which is inert under the reaction conditions.

Regardless of whether a solution or suspension of the polymer is used, the reaction of the polyphenylene oxide and the oxidizing agent is carried out in the presence of a carboxylic acid selected from the group consisting of carboxy-substituted lower alkanes, carboxy-substituted haloalkanes, carboxy-substituted benzenes and carboxy-substituted halobenzenes. The solution or suspension is treated with an oxidizing agent selected from the group consisting of lead dioxide, nickel peroxide, manganic acetate and activated manganese dioxide, preferably adding the oxidizing agent incrementally when a high molecular polyphenylene oxide is used. In order to obtain maximum yields of the p-benzoquinones, at least two equivalents of the oxidizing agent should be added for each equivalent weight of polymer unit in the polyphenylene oxide, i.e., if the polyphenylene oxide is poly(2,6-dimethyl-1,4-phenylene oxide), there should be the two equivalents of oxidizing agent (one mole of the oxides, two moles of the manganic acetate) used for each 120 grams of polymer. Likewise for maximum yield, there should be a sufficient amount of carboxylic acid used to react with all of the metal ion of the oxidizing agent, i.e., if the metal oxide is lead dioxide and the carboxylic acid is acetic acid, then two moles of acetic acid should be used for each mole of lead dioxide.

As will be readily understood by those versed in the art, the reaction will proceed, if lesser amounts of the oxidizing agent and carboxylic acid are used, but any deficiency will be reflected in a decreased yield of the corresponding p-benzoquinones. When a deficiency of either of these two reagents is used, only that amount of the polyphenylene oxide will be converted to the p-benzoquinone as is equivalent to the amount of reagents used. An excess of either the carboxylic acid or the oxidizing agent is not detrimental and an excess of both can be used to speed up the reaction and assure the maximum yield of the p-benzoquinone.

Although the reaction proceeds at room temperature, it is preferable to hasten the reaction by heating the solution, since it is well known that the speed of any reaction is approximately doubled for each 10° C. rise in temperature. Temperatures up to the reflux temperature at the ambient of pressure existing over the reaction mixture can be used. Although, superatmospheric or subatmospheric pressures can be used, there is no benefit generally to be gained, due to the added cost of pressure equipment.

Any solvent which is inert under the reaction conditions can be used when it is desired to use a solution of the polyphenylene oxide for the reaction. The readily available liquid aromatic hydrocarbons are generally preferred, since they are cheap, readily available and are excellent solvents for the polyphenylene oxides. They have boiling points which permit the reaction to be carried out at their reflux temperatures where the reaction proceeds very readily and therefore requires no further temperature control, other than that provided by the refluxing solvent itself. The metal oxides, per se, do not dissolve in the reaction mixture, although they do dissolve during the reaction to form the corresponding divalent salts of the carboxylic acid, whereas manganic acetate is soluble in the liquid carboxylic acids. Therefore, agitation, for example, by shaking, stirring, etc., increases the reaction rate where two phases are present and is desirable even if the reaction mixture is homogeneous.

The polyphenylene oxides, which can be converted to the corresponding p-benzoquinones are those having the general formula

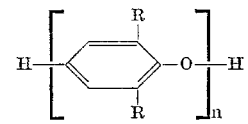

where $n$ is at least two and represents the average degree of polymerization (average number of repeating units in the polymer molecule), and each R is a monovalent substituent independently selected from the group consisting of hydrocarbon radicals free of a tertiary $\alpha$-carbon atom, halohydrocarbon radicals having at least two carbon atoms between the halogen atom and phenol nucleus and being free of a tertiary $\alpha$-carbon atom, and halocarbonoxy radical having at least two carbon atoms between the halogen atom and phenol nucleus and being free of a tertiary $\alpha$-carbon atom. As previously stated the molecular weight of the polymer, as represented by $n$, is not critical. My process is equally applicable to the dimer where $n$ is 2 up to the highest molecular weight polymers where $n$ can be 1000 or more.

Polyphenylene oxides corresponding to the above formula and processes for producing the same are fully disclosed in the above referenced U.S. patents and especially 3,306,874 and 3,306,875, including typical examples of the various radicals represented by R. The disclosure of these patents with regards to the particular polyphenylene oxides having the above general formula are hereby incorporated by reference. The preferred polyphenylene oxides are those wherein each R is independently selected from the group consisting of $C_{1-8}$ alkyl, including cycloalkyl and aryl substituted alkyl and in addition, phenyl, $C_{1-8}$ alkyl substituted phenyl, halophenyl, biphenylyl and terphenylyl since the 2,6-disubstituted phenols containing such substituents are the most readily available and suitable for making the poly(2,6-disubstituted-1,4-phenylene oxides). However, all of the polyphenylene oxides falling within the scope of the above general formula can be used.

Lead dioxide is readily available as a commercial product. Nickel peroxide is readily prepared by the method disclosed by Nakagawa in J. Org. Chem. 27, 1597 (1962), i.e., by treatment of an aqueous solution of a nickel salt with sodium hypochloride made alkaline with sodium hydroxide. Active manganese dioxide, is well known and described for example by Attenburrow et al. in J. Chem. Soc. 1952, 1094. It is a finely divided manganese dioxide formed by precipitation from an aqueous solution of a manganese salt and potassium permanganate with aqueous alkali. Manganic acetate is readily prepared by the method disclosed by Andrulis in J. Am. Chem. Soc., 88, 5473 (1966), i.e., by oxidizing manganous acetate with potassium permanganate in glacial acetic acid. Since the lead dioxide is as effective for my reaction as the other oxidizing agents, and is the only one commercially available, it is preferred for this reason.

Other oxidizing agents may be used in place of the above oxidizing agents, for example, the copper complex with pyridine and methanol disclosed and claimed in U.S. Pat. 3,277,095—Blanchard et al., peroxides, such as, benzoyl peroxide, dicumyl peroxide, 2,5-di-tert.-butylperoxyhexane, 2,5-ditert.-butylperoxyhexyne-3, etc., various diphenoquinones, etc. However, such oxidizing agents are not as effective and complicate the reaction since they produce by-products, some of which are apparently produced by reaction of these oxidizing agents with the p-benzoquinone product.

Since the carboxylic acid does not become part of the final product, although as explained later, it enters into the reaction, any of the readily available carboxylic acids which are not readily oxidized by the oxidizing agent may be used. Preferably they are carboxylic acids selected from the group consisting of carboxy-substituted lower alkanes, carboxy-substituted haloalkanes, carboxy-substituted benzenes and carboxy-substituted halobenzenes. Typical examples of which are acetic acid, mono-, di- and trichloroacetic acids, fluoroacetic acid, bromoacetic acid, iodoacetic acid, propionic acid, chloropropionic acid, butyric acid, isobutyric acid, valeric acid, caprylic acid, pelargonic acid, malonic acid, succinic acid, tartaric acid, citric acid, phenylacetic acid, benzoic acid, chlorobenzoic acid, toluic acid, o-, m-, p-phthalic acids, trimesic acid, hemimellitic acid, trimellitic acid, pyromellitic acids, prehnitic acid, mellophanic acid, benzene tetracarboxylic acid, mellitic acid, etc. Since acetic and benzoic acids are just as effective as the other acids and are much more readily available at a lower cost, they are the preferred acids. When manganic acetate is used with an excess of an acid other than acetic acid, the manganic salt will generally be that of the added carboxylic acid. Since it is the manganic ion in solution which serves as the oxidizing agent, such salts are the full equivalents of manganic acetate.

I have observed that when an insufficient amount of oxidizing agent is used, the reaction mixture, in addition to containing the p-benzoquinone will also contain some 4-acyloxy-2,6-disubstituted phenol corresponding to the 2,6-disubstituted phenylene oxide unit in the polymer and the acyloxy group of the carboxylic acid. The amount of this 4-acyloxy derivative increases as the amount of oxidizing agent is increased from very low amounts up to a certain point and thereafter decreases until none is detected when a sufficient amount of the oxidizing agent is used. Furthermore, if the isolated 4-acyloxy-2,6-disubstituted phenol is reacted with an additional amount of the oxidizing agent in the presence of the carboxylic acid, it is oxidized to the corresponding p-benzoquinone.

As mentioned previously, it is preferable to add the oxidizing agent in incremental amounts especially when high molecular weight polymers are used and permit it to completely react before adding additional oxidizing agent. Such a procedure produces the maximum yield for the amount of reagents used. When very low molecular weight polymers, e.g., dimer, trimer, tetramer, etc., are used the oxidizing agent can be added all at once. It could very well be that the 4-acyloxy-2,6-disubstituted phenol, which will be present in larger amounts when incremental additions are made, enter into the reaction by causing redistribution of the polyphenylene oxide to lower molecular weight products by the sort of mechanism disclosed and claimed in the above-mentioned Cooper et al. copending application.

In order that those skilled in the art may better understand my invention, the following examples are given by way of illustration and not by way of limitation.

In all of the examples, temperatures are in ° C. and percentages are by weight unless stated otherwise. Where elemental analyses are given, the values are percents by weight of the elements and the values in parenthesis are the theoretical values.

EXAMPLE 1

Six reaction mixtures were made up, each containing 1.0 g. of poly(2,6-dimethyl-1,4-phenylene oxide) powder suspended in 30 ml. of acetic acid. These suspensions were heated to their reflux temperature and the amount of lead dioxide shown in Table I was added in 200 mg. portions. After each addition, sufficient time elapsed before the next addition to permit the lead dioxide to completely dissolve. After the last addition and cooling to room temperature, the reaction mixtures were diluted with 50 ml. of benzene, the benzene solution washed several times with water and dried over magnesium sulfate.

Analyses of the solutions by vapor phase chromatography showed that the principal product was 2,6-dimethyl-p-benzoquinone and that the amount of 4-acetoxy-2,6-dimethylphenol varied with the amount of lead dioxide. The 4-acetoxy-2,6-dimethylphenol present is shown in Table I.

TABLE I

|   | Amount of $PbO_2$ in g. | Amount of 4-acetoxy-2,6-dimethylphenol in g. |
|---|---|---|
| A | 0.2 | 0.167 |
| B | .4 | .415 |
| C | .6 | .410 |
| D | .8 | .420 |
| E | 1.0 | .405 |
| F | 3.0 | None |

The results show that as the amount of metal oxide is increased, the amount of the 4-acetoxy-2,6-dimethylphenol increases and then decreases and finally disappears as larger amounts are used. Distillation of the benzene permitted the 4-acetoxy-2,6-dimethylphenol to be isolated as a solid having a melting point of 93–95°, which agrees very well with that reported in the literature of 94–95°. Elemental analysis showed that it had C, 66.4 (66.5); H, 6.7 (6.71) molecular weight 184 (180). In the case of solution F, after evaporation of the benzene, the solid residue was sublimed at 20 mm. Hg, yielding the 2,6-dimethyl-p-benzoquinone identified by its melting point of 70–72°, which agrees with the value of 71–72°, reported in the literature. Furthermore, the PMR and infrared spectra were in agreement with that of the authentic sample of 2,6-dimethyl-p-benzoquinone.

When the above reaction was repeated for solution F, but using chloroacetic acid and propionic acid for the acetic acid in two different reactions, identical results were obtained except that a somewhat lower yield of the 2,6-dimethyl-p-benzoquinone was obtained.

EXAMPLE 2

In this example, each of the p-benzoquinones shown in Table II were prepared from the corresponding polyphenylene oxide containing the same R substituents. The procedure used in making all of these p-benzoquinones was to slowly add 100 ml. of acetic acid to a refluxing solution of 24 g. of the polymer in 200 ml. of toluene. Thereafter, a total of 40 g. of lead dioxide was incrementally added over about a 3-hour period with sufficient time elapsing between each addition to allow the lead dioxide previously added to dissolve. The reaction was cooled and poured into 600 ml. of water, the toluene phase separated and the aqueous phase extracted with two additional 200 ml. portions of toluene. After combining the toluene phases, approximately 400 ml. of toluene was distilled and the remainder poured into 500 ml. of methanol to precipitate any of the unreacted polymer. After filtering, the p-benzoquinone product which remained dissolved was isolated by distillation at 10 mm. Hg pressure. The results are shown in Table II.

TABLE II

Polyphenylene oxide used 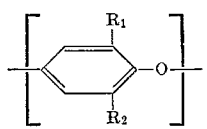     p-Benzoquinone product 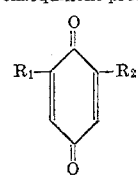

| $R_1$ | $R_2$ | M.P., ° C | H | M.W. |
|---|---|---|---|---|
| $C_6H_5$— | $C_6H_{11}$— | 100–105 | 18.1 (81.17) 7.0 (6.81) | 293 (266) |
| i-$C_3H_7$— | $CH_3$— | 120–121 | 72.1 (73.14) 8.5 (7.37) | 171 (164) |
| $C_6H_5$— | $C_6H_5$— | 133–135 | 83.0 (83.06) 4.7 (4.65) | 265 (260) |
| $C_6H_5$— | $CH_3$— | 51–54 | 78.8 (78.77) 5.2 (5.09) | 204 (198) |
| $C_6H_5CH_2$— | $CH_3$— | Liquid | 79.0 (79.22) 5.6 (5.70) | 230 (212) |

When the above reaction was repeated for poly(2,6-diphenyl-1,4-phenylene oxide), but using benzoic acid in place of the acetic acid, the yield of 2,6-diphenyl-p-benzoquinone was essentially the same as that obtained with acetic acid.

EXAMPLE 3

This example illustrates the polymerization of a 2,6-disubstituted phenol to the corresponding polyphenylene oxide and thereafter conversion to the corresponding p-benzoquinone. A solution of 10 g. of 2-methyl-6-phenylphenol in 50 ml. of toluene at room temperature was converted to poly(2-methyl-6-phenyl-1,4-phenylene oxide) by slow addition of 32 g. of lead dioxide. During the addition, an exothermic reaction took place which was allowed to cool to room temperature. Lead dioxide was still present as a solid phase in the solution. Without isolation of the polyphenylene oxide, 50 ml. of glacial acetic acid was added followed by refluxing for 12 hours.

The reaction mixture was poured into 250 ml. of water and the toluene layer separated. The aqueous layer was extracted with two 50 ml. portions of toluene and combined with the toluene solution. After drying, the toluene solution over anhydrous magnesium sulfate, the solution was distilled, yielding 5.1 g. of 2-methyl-6-phenyl-p-benzoquinone which boiled at 103° at 0.1 mm. pressure. At room temperature, it was a solid crystalline material having a melting point of 51–54° which agrees with the melting point of the material obtained as the identical compound prepared in Example 2.

When the reaction was repeated except that the acetic acid was present during the addition of the lead dioxide, the product obtained was 3,3'-dimethyl-5,5'-diphenyldiphenoquinone, rather than 2-methyl-6-phenyl-p-benzoquinone.

EXAMPLE 4

A solution of 1.0 g. of tris(2,6-dimethyl-1,4-phenylene oxide)—both R's are methyl and $n$ is 3 in general formula—and 4.5 g. of $Mn(OAc)_3 \cdot 2H_2O$ in 10 ml. of glacial acetic acid was stirred at 30°. After 2 hours the dark color of the manganic acetate had been replaced by the pale yellow of 2,6-dimethyl-p-benzoquinone. The reaction mixture was filtered to remove the precipitated manganous acetate and poured into 50 ml. of benzene. After extracting the acetic acid by washing the solution 4 times with 20 ml. portions of water, it was dried and the benzene removed on a rotary evaporator. The 2,6-dimethyl-p-benzoquinone was dissolved in 50 ml. of n-hexane and filtered to remove the 3,3',5,5'-tetramethyl-diphenoquinone. There was obtained 700 mg. of crude 2,6-dimethyl-p-benzoquinone and 188 mg. of diphenoquinone.

EXAMPLE 5

To a solution of 1.0 g. of tris(2,6-dimethyl-1,4-phenylene oxide) in 25 ml. of glacial acetic acid, 2.78 g. of nickel peroxide was added. After the mixture had refluxed for 2 hours, the black nickel peroxide had been replaced by a pale green solid. After filtering off the solid, it was washed with 100 ml. of benzene, the benzene was added to the acetic acid solution and the mixture extracted three times with 25 ml. portions of water. After drying over magnesium sulfate, the benzene was removed on a rotary evaporator and the product sublimed at 20 mm. Hg. The yield of crude 2,6-dimethyl-benzoquinone was 186 mg.

EXAMPLE 6

To a solution of 1.0 g. of tris(2,6-dimethyl-1,4-phenylene oxide) in 25 ml. of glacial acetic acid, 1.5 g. of active manganese dioxide was added. After two hours at reflux, the manganese dioxide had dissolved and the workup was as described in Example 5. The yield of crude 2,6-dimethylbenzoquinone was 718 mg.

The p-benzoquinones prepared by my process have a wide variety of uses. As mentioned previously, they may be used as oxidizing agents for the preparation of other organic compounds as well known in the art or they may be reduced, for example, by treatment with acidified zinc, hydrogen or by mild reducing agents, for example, hydrazine to the corresponding 2,6-disubstituted hydroquinones. These hydroquinones can be reacted with phosgene, diacyl halides or mixtures of phosgene and diacyl halides to produce polycarbonates, polyesters, or mixed polycarbonate-polyester resins, i.e., graft, block or random copolymers. They likewise can be reacted with epichlorohydrins to produce the corresponding diglycidyl ethers, useful in making epoxy resins or reacted with diisocyanates to produce polymeric intermediates useful in the making of polyurethane resins by reacting the diisocyanate reaction product with a polyamine. These and other uses for the p-benzoquinones will be readily recognized by those skilled in the art.

While the present invention has been described by reference to particular embodiments and examples thereof, variations will readily occur by those skilled in the art. It is intended, therefore, in the appended claims to cover all the equivalents as may be in the true spirit and scope of the foregoing description without departing from the scope of the invention.

What I claim as new and desire to secure by Letters Patent of the United States is:

1. The process of producing p-benzoquinones which comprise reacting an oxidizing agent selected from the group consisting of nickel peroxide, lead dioxide, active manganese dioxide and manganic acetate with a polyphenylene oxide having the formula

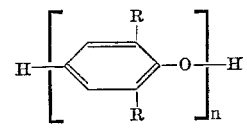

where $n$ is at least two, and each R is a monovalent substituent independently selected from the group consisting of hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals being free of a tertiary α-carbon atom, and halocarbonoxy radical having at least two carbon atoms between the halogen atom and phenol nucleus and being free of a tertiary α-carbon atom, said reaction being carried out in the presence of an acid selected from the group consisting of carboxy-substituted lower alkanes, carboxy-substituted haloalkanes, carboxy-substituted benzenes and carboxy-substituted halobenzenes.

2. The process of claim 1, wherein each R is an alkyl radical free of a tertiary α-carbon atom.

3. The process of claim 1, wherein one R is an alkyl radical free of a tertiary α-carbon atom and the other R is aryl.

4. The process of claim 1, wherein each R is aryl.

5. The process of claim 1, wherein the acid is acetic acid.

6. The process of claim 1, wherein the oxidizing agent is lead dioxide.

7. The process of claim 1, wherein the oxidizing agent is lead dioxide, each R is alkyl and the acid is acetic acid.

8. The process of claim 1, wherein the oxidizing agent is lead dioxide, one R is alkyl, the other R is aryl and the acid is acetic acid.

9. The process of claim 1, wherein the oxidizing agent is lead dioxide, each R is aryl and the acid is acetic acid.

10. The process of producing 2,6-dimethyl-p-benzoquinone which comprises the process of claim 1, wherein the oxidizing agent is lead dioxide, each R is methyl and the acid is acetic acid.

11. The process of producing 2-cyclohexyl-6-phenyl-p-benzoquinone which comprises the process of claim 1, wherein the oxidizing agent is lead dioxide, one R is cyclohexyl, the other R is phenyl and the acid is acetic acid.

12. The process of making 2-methyl-6-phenyl-p-benzoquinone which comprises the process of claim 1, wherein the oxidizing agent is lead dioxide, one R is methyl, the other R is phenyl and the acid is acetic acid.

References Cited

UNITED STATES PATENTS 3,306,874   2/1967   Hay _____ 260—396

CHARLES B. PARKER, Primary Examiner

L. A. THAXTON, Assistant Examiner

U.S. Cl. X.R.

260—479